April 8, 1924.

W. ASBURY 1,489,808

SAFETY DEVICE FOR SPRING MOTORS

Filed Nov. 10, 1921   2 Sheets-Sheet 1

INVENTOR.
William Asbury
BY Jas. H. Griffin
ATTORNEYS.

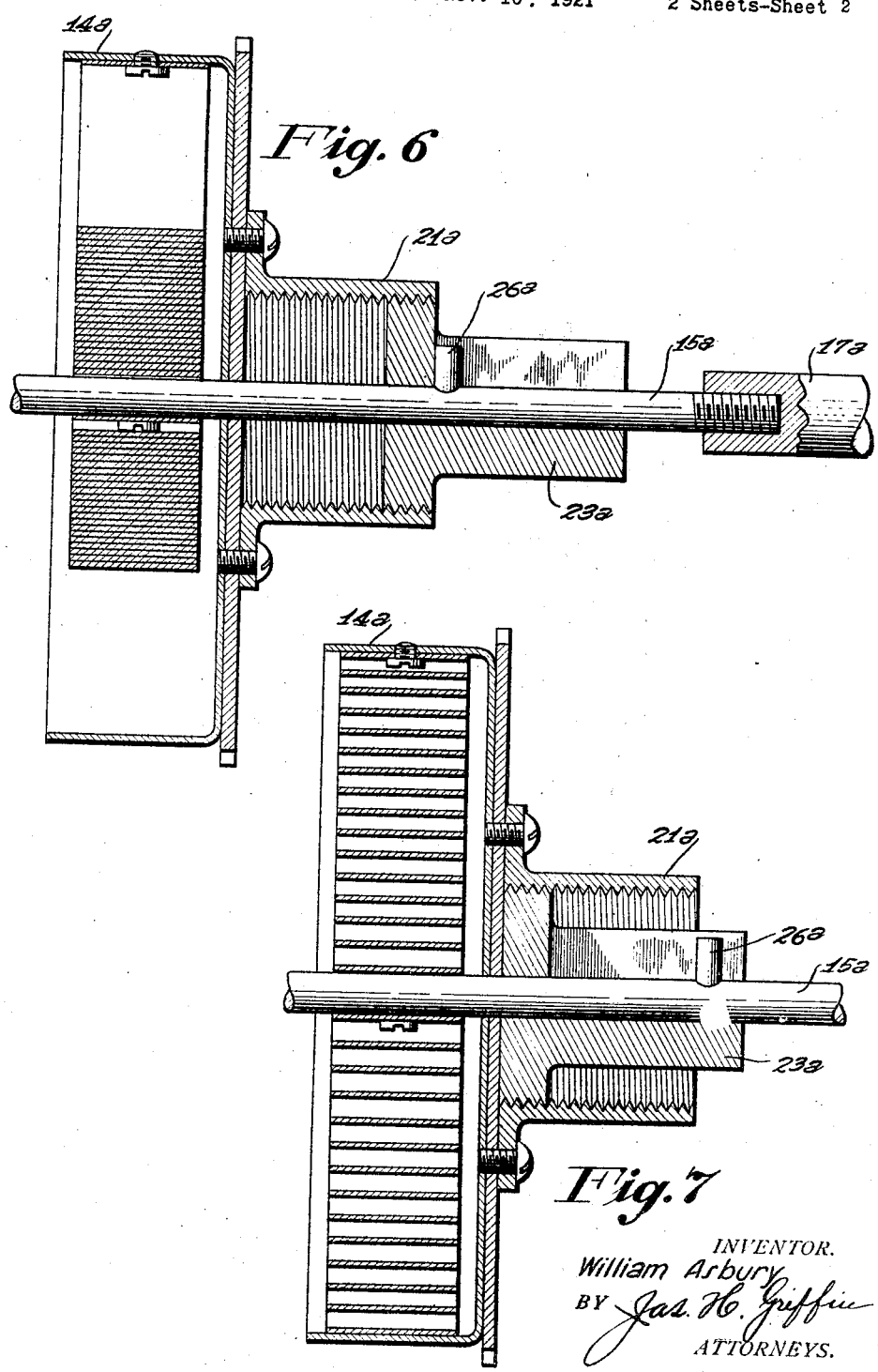

Patented Apr. 8, 1924.

1,489,808

UNITED STATES PATENT OFFICE.

WILLIAM ASBURY, OF NEW YORK, N. Y., ASSIGNOR OF ONE-HALF TO SAMUEL TURNER, OF NEW YORK, N. Y.

SAFETY DEVICE FOR SPRING MOTORS.

Application filed November 10, 1921. Serial No. 514,185.

*To all whom it may concern:*

Be it known that I, WILLIAM ASBURY, a subject of the King of Great Britain, residing at 512 East 159th Street, city, county, and State of New York, have invented a certain new and useful Safety Device for Spring Motors, of which the following is a specification.

This invention is a safety device for spring motors and, while particularly intended to be associated with the spring motors of clocks, watches of all kinds, phonographs, toys, sewing machines, music boxes and other analogous devices, is adapted for general application.

In all spring motors there is a tendency for an operator to wind them so tightly as to either preclude their proper functioning or, in the smaller and more delicate motors, to wind them so tightly as to effect a breakage of the same. Numerous attachments have been heretofore suggested for use, more especially with phonograph motors to preclude the successive winding but, so far as I am aware, all of these prior devices are one form or another of friction clutch which is not dependable and does not properly safeguard the spring against breakage or being too tightly wound.

The present invention, in contradistinction, provides a positive mechanical lock for locking the winding element or shaft against rotation after it has been given a predetermined number of turns, the object of the invention being to provide a purely mechanical and positive safeguard for the spring.

In one of its practical forms, of which there may be many, the invention is carried out by associating with the winding mechanism a threaded member adapted, during the winding of the spring, to be positively shifted longitudinally in the direction of a relatively fixed stop so that after a predetermined number of turns of the spring have been completed the threaded member is brought into engagement with the stop and locks the winding parts against further operation. The broad underlying principle of this invention resides, primarily, in the positive mechanical lock which, after initial adjustment, cannot get out of order or fail to properly function.

Features of the invention, other than those adverted to, will be apparent from the hereinafter detailed description and claims, when read in conjunction with the accompanying drawings.

The accompanying drawings illustrate different practical embodiments of the invention, but the constructions therein shown, are to be understood as illustrative only, and not as defining the limits of the invention.

Figure 1:
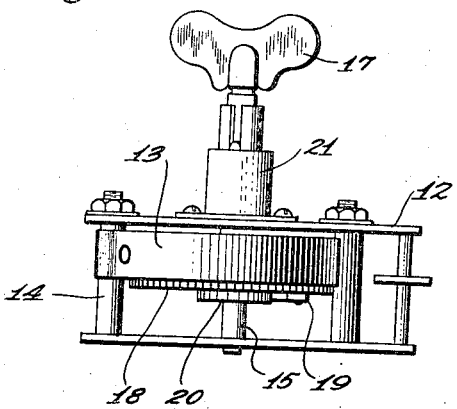
Figure 1 is a side elevation of a clock movement embodying the present invention.
Figure 2:
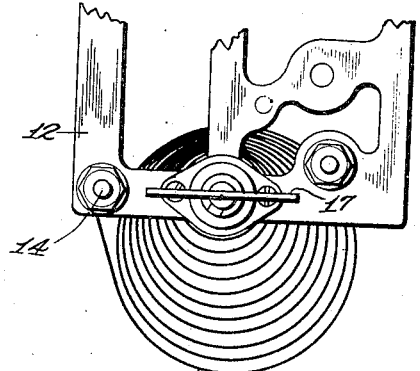
Figure 2 is a fragmentary plan view of the construction shown in Figure 1.
Figure 5:
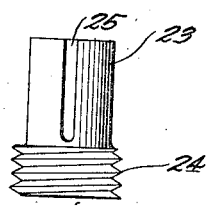
Figure 5 is a detailed side elevation of a threaded locking member employed in the constructions of Figures 1 to 4, and Figures 6 and 7 show modified forms of construction in central section, the former showing the spring fully wound and the latter showing the spring completely unwound.
Figure 3:
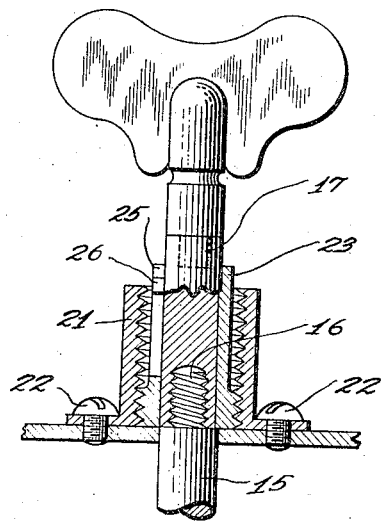
Figure 3 is a fragmentary section taken in the plane of the axis of the winding shaft in the construction in Figures 1 and 2, showing the parts as they appear when the spring is completely run down.
Figure 4:
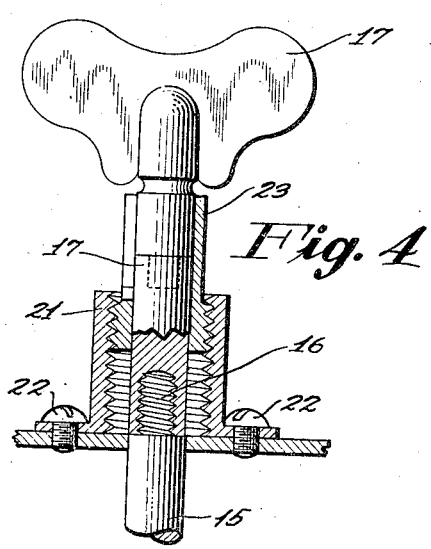
Figure 4 is a view similar to Figure 3, but illustrating the parts in the position which they partake when the spring is fully wound.

Referring to the drawings and, more particularly, to the construction as shown in Figures 1 to 5 inclusive, 12 designates the frame of a clock movement such as is commonly found in clocks, alarm clocks, time clocks, toys and spring motors of other devices. In the construction shown, the spring 13 is secured at one of its ends to the post 14 of the frame, while its other end is secured to a winding shaft 15, one end of which is journaled for rotation in the lower plate of the frame, while the other end is journaled for rotation in the upper plate of the frame and projecting above such upper plate of the frame is a reduced threaded portion of shank 16 having a left hand thread on which a winding key 17 is adapted to be screwed. A driving gear 18 is usually loose on the shaft 15 below the spring and carries a pawl adapted to engage with a ratchet 20 fixed on the winding shaft 15, all as clearly shown in Figure 1. In practice, the gear 18 forms a part of the driving train of the clock movement and is impelled by the spring 13 through the pawl and ratchet 19 and 20. When it is desired to wind the spring, the key 17 is rotated counter clock-wise, and during this operation the pawl and ratchet connection operates to permit the winding of the spring and to lock it in wound condition, so that it can slowly unwind through the driving of the gear.

The present invention may be readily associated with a construction of the character described by mounting on the upper plate of the frame 12 a tubular sleeve 21. In practice, the sleeve may either be made integral with the plate of the frame or may be secured thereto by means of screws 22. In either instance, said sleeve is provided interiorly with a right hand thread preferably extending throughout the length thereof and with these threads is adapted to cooperate a locking member 23 shown in detail in Figure 5.

The locking member 23 is tubular in form and is provided for either its entire length or for a portion of its length only with exterior right hand threads 24 and said sleeve is, moreover, further provided for a portion of its length and extending from one end thereof with a longitudinal slot 25. The interior diameter of the locking member is such that it will closely embrace the shank of the key 17, while its exterior diameter is such as to adapt it to be screwed into the sleeve 21. A pin or stop 26 is rigid on the key 17 and is adapted to work in the slot 25 of the locking member.

The parts are preferably assembled while the spring is completely unwound, in which instance the locking member 23, brought into a position to embrace the shank of the key, the key is screwed upon the left hand threaded shank of the winding shaft, the locking member 23 is screwed to the base of the sleeve 21 and into engagement with the upper plate of the clock frame, and the sleeve, in turn, is secured to the frame by the screws 22. The parts then partake of the positions shown in Figure 3, wherein it will be noted that the stop 26 of the key occupies the slot 25 adjacent the open end thereof.

If it be borne in mind that the shank 16 is a left hand thread and that the sleeve 21 and locking member 24 have right hand threaded connection, it will be manifest that, if the key is rotated counter clock-wise to wind the spring, this winding of the spring will be accompanied by a travel of the locking member 23 outwardly along the key. As the winding continues, the locking member 23 is shifted longitudinally of the key and the blind end of the slot 25 of said member is caused to approach the stop 26. The slot 25 is of such length, and the parts are so adjusted, that by the time the winding shaft has been given the desired number of turns, to effect a winding of the spring, the blind end of the slot 25 engages with the stop 26 and further rotation of the key is rendered impossible. The parts are locked tightly together and overwinding of the spring is thus precluded. When the spring is fully wound, the parts will have taken the positions shown in Figure 4.

After the clock has been wound in the manner described, it is left to run down in the usual manner through the operation of the works thereof. Through the lapse of time occupied by the running down of the spring, the locking member 23 will be slowly retracted from the position shown in Figure 4 so that by the time the spring has entirely run down, the locking member 23 will be retracted to the position shown in Figure 3, wherein it will engage with the upper plate of the frame and preclude further uncoiling of the spring. The locking member 23 thus precludes overwinding of the spring and also precludes the uncoiling of the spring to a greater degree than predetermined.

The construction of Figures 1 to 5 is typical of that form of spring motor wherein one end of the spring is secured to a rigid part and the other end thereof is secured to a winding shaft. There are types of spring movements, however, wherein one end of the spring is secured to a cup associated with the driving gear, while the other end of the spring is secured to a winding shaft. Such a construction is shown in Figures 6 and 7. In carrying out the present invention with this form of spring motor, the sleeve 21$^a$, which corresponds to the sleeve 21, may be secured to a spring cup, while the locking member 23$^a$, corresponding to the locking member 23, may be threaded thereinto in the same manner as hereinbefore described and cooperates with a stop 26$^a$ so as to lock the winding shaft 15$^a$ against rotation after the spring has been wound through the agency of a winding crank or key 17$^a$ shown in Figure 6.

Figure 7 shows the spring fully unwound, and it will be apparent that, when the spring is wound, the locking member 23$^a$ will move from the position of Figure 7 to the position of Figure 6 by virtue of the rotation of the shaft 15$^a$, while the spring cup 14$^a$ remains relatively stationary and by the further right hand threaded connection between the locking member and the sleeve 21$^a$.

In the foregoing detailed description, I have set forth different embodiments of the present invention, showing its application to different types of spring motors. I am aware, however, that the invention is not limited to these types only, and that those skilled in the art can, by reference to the constructions described, readily adapt the invention to other types of spring motors without departing from this invention, which is to be understood as broadly novel as is commensurate with the appended claims.

The present invention provides simple, highly meritorious and efficient means for precluding the overwinding of springs and their consequent breakage or inefficient operation. The construction is so simple that it can be incorporated in spring motor construction without unduly encumbering the same and, when so associated therewith, will act as a positive safeguard against breakage. The invention may partake of different forms as will be manifest from the different environments in which it may be used and is indeed adapted for general application wherever spring motors are employed.

Having thus fully described the invention, what I claim as new and desire to secure by Letters Patent, is:

1. A spring motor embodying a spring, a winding spindle for winding said spring, a pair of cooperating threaded members coaxial with each other and with the spindle, one of which is locked to the winding spindle for rotation therewith but adapted for movement longitudinally thereof, and the other of which is fixed against such rotation or longitudinal movement, so that the rotation of the winding spindle effects longitudinal movement of one of said members, and a stop in the path of the longitudinally movable member and positioned to be engaged by said member after the spring has been wound to a predetermined extent, to preclude further winding of the spring.

2. A spring motor embodying a spring, a winding spindle for winding said spring, an interiorly threaded member mounted in fixed position coaxially of the spindle, a cooperating coaxial exteriorly threaded member, secured for rotation to the winding element but adapted for movement longitudinally of said spindle so that when the spindle is rotated, the exteriorly threaded member is rotated and simultaneously shifted longitudinally of the spindle, and a stop in the path of the movable member and adapted to be engaged thereby after the spring has been wound to a predetermined extent, to preclude further winding of the spring.

3. A spring motor embodying a spring, a winding element for winding said spring, a pair of coaxial cooperating threaded members, one of which is fixed against rotation, and the other of which is rotatable with the winding element and serves, through such rotation, to impart longitudinal movement to the other, and a stop in the path of the longitudinally movable member adapted to be engaged by said member after the spring has been wound to a predetermined extent to preclude overwinding of the spring.

4. A spring motor embodying a spring, a winding spindle for winding said spring, a member mounted for sliding movement longitudinally on the winding spindle but locked for rotation therewith, means, independent of the winding spindle, and cooperating with said member to cause said member to be slid longitudinally of the spindle when the spindle is rotated to wind the spring, and stop means positioned in the path of said member and adapted to be engaged thereby after the spring is wound to a predetermined extent to preclude further winding of the spring.

5. A spring motor embodying a spring, a winding spindle for winding said spring, a member mounted for free sliding movement on the spindle but locked to the spindle for rotation therewith, a fixed threaded member having threaded engagement with the sliding member whereby rotation of the winding spindle will result in movement of the sliding member longitudinally of the spindle, and stop means positioned in the path of the sliding member and adapted to be engaged thereby after the spring is wound to a predetermined extent to preclude further winding of the spring.

In testimony whereof I have signed the foregoing specification.

WILLIAM ASBURY.